US006804490B2

(12) United States Patent
Cook et al.

(10) Patent No.: US 6,804,490 B2
(45) Date of Patent: Oct. 12, 2004

(54) SELECTIVE MESSAGE BROADCASTING SYSTEM

(75) Inventors: L. Kevin Cook, Jacksonville, FL (US); Andrew L. Smith, Ponte Vedra Beach, FL (US)

(73) Assignee: Safety Cast Corporation, Jacksonville, FL (US)

( * ) Notice: Subject to any disclaimer, the term of this patent is extended or adjusted under 35 U.S.C. 154(b) by 40 days.

(21) Appl. No.: 10/265,753

(22) Filed: Oct. 7, 2002

(65) Prior Publication Data

US 2004/0067733 A1 Apr. 8, 2004

(51) Int. Cl.[7] ........................ H04B 17/00

(52) U.S. Cl. .................. 455/3.01; 455/3.06; 455/560; 455/561; 455/12.1; 341/141; 370/328; 370/356

(58) Field of Search .................. 455/3.01, 569.1, 455/12.1, 561, 560, 3.06; 341/141, 328, 356

(56) References Cited

U.S. PATENT DOCUMENTS

| | | | | |
|---|---|---|---|---|
| 3,876,940 A | | 4/1975 | Wickord et al. | 325/64 |
| 4,219,837 A | | 8/1980 | Sluis et al. | 367/128 |
| 4,443,790 A | | 4/1984 | Bishop | 340/539 |
| 4,713,661 A | | 12/1987 | Boone et al. | 340/994 |
| 4,764,978 A | * | 8/1988 | Argo et al. | 455/1 |
| 5,144,301 A | | 9/1992 | Jackson et al. | 340/994 |
| 5,343,168 A | * | 8/1994 | Guthrie | 331/16 |
| 5,635,921 A | * | 6/1997 | Maxwell et al. | 340/902 |
| 5,815,802 A | * | 9/1998 | Loechner, II | 455/414.1 |
| 5,889,475 A | | 3/1999 | Klosinski et al. | 340/902 |
| 6,087,961 A | * | 7/2000 | Markow | 340/902 |
| 6,160,493 A | | 12/2000 | Smith | 340/902 |
| 6,191,708 B1 | | 2/2001 | Davidson | 340/994 |
| 6,252,521 B1 | | 6/2001 | Griffin et al. | 340/903 |
| 6,411,891 B1 | | 6/2002 | Jones | 701/201 |
| 6,417,782 B1 | | 7/2002 | Darnall | 340/902 |

* cited by examiner

*Primary Examiner*—Nay Maung
*Assistant Examiner*—Alan T. Gantt
(74) *Attorney, Agent, or Firm*—Akerman Senterfitt

(57) ABSTRACT

A selective message broadcasting system. The system can include fixed storage configured to store pre-recorded audio messages. A digital audio system can be coupled to the fixed storage, and can include playback logic for playing back selected ones of the pre-recorded audio messages. A center frequency modulator can be coupled to the digital audio system and the modulator can be configured to modulate the selected ones of the pre-recorded audio messages about a center frequency in a particular broadcast spectrum. Finally, a frequency band comb distributor can be coupled to the center frequency modulator and configured to replicate the modulated selected ones of the pre-recorded audio messages across a set of frequency transmission channels in the particular broadcast spectrum while maintaining a silence interval between each of the frequency transmission channels in the particular broadcast spectrum. Notably, the broadcast spectrum can include the FM spectrum and the AM spectrum.

18 Claims, 3 Drawing Sheets

SELECTIVE MESSAGE BROADCASTING SYSTEM

BACKGROUND OF THE INVENTION

1. Statement of the Technical Field

The present invention relates to the field of message broadcasting and more particularly close range broadcasting of messages to localized receivers.

2. Description of the Related Art

Many accidents and fatalities occur annually in consequence of motorists who remain oblivious to developing and existing road hazards which are encountered in the route of the motorists. Examples include passing emergency vehicles such as fire trucks, ambulances and police cruisers, parked vehicles in the roadway such as police cruisers who have executed a traffic stop or buses into which and from which passengers have entered and exited, respectively, unexpected train crossings, obscured construction sites, stopping buses and other such vehicles and the like. In those circumstances where a passing motorist remains unaware of a road hazard, particularly in those cases where the roadway environment lacks visibility, the motorist will fall victim to the hazard, resulting either in injury to the motorist, a nearby pedestrian, or other motorists in the vicinity of the road hazard.

Recognizing the need to alert motorists of approaching danger, several mechanisms and processes have been implemented to prevent resulting harm. Specifically, emergency vehicles have long utilized noise making and visual attention getting devices such as sirens to alert nearby motorists of an approaching emergency vehicle-even where the motorist may be audibly distracted through the operation of a car stereo. Similarly, for nearly a decade selected radar detectors in combination with specialized transmitters have been configured to report the proximity of construction activity through the radar detectors. Finally, buses and other large vehicles have been retrofitted in the past with visual signs which alert following motorists to the impending stoppage of the bus or vehicle.

Nevertheless, the use of sirens and visual signs alone cannot prove effective for those motorists where are not within earshot or sight of the road hazard. To that end, several have developed road hazard advance notification systems. For instance, U.S. Pat. No. 6,411,891 B1 issued on Jun. 25, 2002 to Jones and assigned to Global Research Systems, Inc. teaches an advance notification system which can notify users of the impending arrival of a transportation vehicle, for instance a school bus. The system can include each of a vehicle control unit, a base station, and any number of receiving devices, such as a pager, television, mobile phone, or office phone. As Jones requires subscribers to request notification of a particular vehicle, however, Jones fails to directly address the problem at hand. Hence, the Jones teachings cannot be applied to the problem of the unanticipated approach of a vehicle.

U.S. Pat. No. 5,889,475 issued on Mar. 30, 1999 to Klosinski et al. more directly addresses the problem of detecting approaching road hazards—specifically emergency vehicles. In the Klosinski specification, a fixed traffic control device, such as a traffic signal can be programmed to detect an approaching emergency vehicle. Specifically, a transmitter in the approaching emergency vehicle can transmit an alert to the traffic signal as the vehicle approaches the traffic signal. Responsive to receiving the alert, the traffic signal can emit an audible and visual indication of the oncoming emergency vehicle.

In addition to transmitting the alert to the traffic signal, the transmitter can broadcast a “siren” over AM and FM frequencies at short range so as to override the programming received at those frequencies in the AM and FM receivers disposed in nearby vehicles. In this way, motorists whose use of their respective radio receivers would otherwise inhibit the detection of the traffic signal siren, will be able to hear the siren broadcast through their respective radio receivers. Still, the Klosinski technology cannot effectively provide alert data other than a siren. Consequently, the use of the Klosinski technology alone cannot facilitate motorists for determining the nature and magnitude of the approaching road hazard.

Specifically, upon detecting the siren through a radio receiver, a motorist would not be able to determine whether the alert has arisen from the presence of an emergency vehicle, a stopping bus, or a construction site. While the approach of an emergency vehicle would require that the motorist pull to the side of the roadway as quickly as possible, the approach of a construction site would only require a heightened level of awareness on behalf of the motorist. To pull immediately to the side of the roadway upon detecting an approaching construction site not only would prove counterproductive and reactionary, but also dangerous. Thus, the use of the Klosinski technology can exacerbate the problem at hand as a motorist could conceivable overreact to every siren audibly detected through the radio receiver of the motorist.

U.S. Pat. No. 6,160,493 issued on Dec. 12, 2000 to Smith and assigned to Estech Corporation addresses the deficiencies of Klosinski to the extent that Smith teaches a radio warning system for hazard avoidance which has been configured to identify the source of the hazard within alerts broadcast to radio receivers in proximate vehicles. More particularly, in the Smith disclosure, unique identification information concerning the potentially hazardous condition can be included in the broadcast alert signal. The information specifically can include whether the transmitter has been deployed in an emergency vehicle, school bus, train, construction vehicle, mail or package delivery vehicle or other transport carrier capable of collision.

Nevertheless the Smith technology does not address the need for motorists to understand the exact nature of a road hazard. For instance, while it can be helpful to receive data which generically describes the vehicle involved in a collision, in most cases the skilled artisan would prefer that the motorists which are proximate to a road hazard receive explicit instructions and information regarding a recommended course of action to be performed in response to the approaching road hazard. As the Smith technology can only provide pre-programmed data through a transmitter regarding the type of vehicle approaching the receiver, the Smith technology cannot so provide explicit instructions regarding a recommended course of action to the receiver.

U.S. Pat. No. 4,764,978 issued on Aug. 16, 1988 to Argo et al. for EMERGENCY VEHICLE RADIO TRANSMISSION SYSTEM differs from the Smith technology as the Argo technology can include either or both of an audio tape playback device and a microphone so that real-time information regarding a road hazard can be broadcast to motorists over a broad band of AM and FM frequencies. Specifically, the Argo system is an indicative radio broadcasting system which, through an array of multiple signal filters, signal oscillators, antenna matching blocks, and a multiplicity of inductors, tape recorded messages can be broadcast over a set of FM frequencies so that proximate motorists can receive the recorded message regardless of the FM frequency to which the motorists are tuned.

Notwithstanding the foregoing, the Argo technology as a dated technology suffers from the inherent deficiencies of an analog era. For example, as the Argo technology is an inductive broadcasting system, incorporated high-frequency filters and oscillators constantly must be tuned. Moreover, the Argo design cannot comply with the United States Federal Communications Commission (FCC) requirement that channels must remain separated and silence must exist between channels on the FM band. For example, the Argo technology transmits an audio alert message even between FM channels and at full power, thus obliterating the FCC silence requirement, and possibly preventing modern phase lock loop (PLL) receivers from locking on a particular signal. Additionally, the full power approach of Argo also can reduce the range of transmission and can distort the audio quality.

The Argo system also requires the use of an analog tape playback device to provide alert messages to nearby motorists. First, as analog tape playback mechanisms are primarily mechanical in nature, the Argo technology cannot easily be deployed in extreme environments where excessive vibrations are the norm, such as in emergency vehicles. Second, analog tape playback mechanisms are limited in terms of recording and playing back customized messages, and more particularly in selecting individual messages for playback which have pre-recorded in a single audio tape. The selection of a message from among several messages in an analog audio tape can be both time consuming and difficult—especially through the use of fast-forward and fast-rewind operations. Thus, selecting a particular recorded message in the Argo system could prove complicated and dangerous for the operator of an emergency vehicle. Finally, the use of an analog tape playback mechanism necessarily implies required maintenance which, in the absence thereof, could result in playback failure.

A careful review of the prior art will indicate to one of ordinary skill in the art that present systems for broadcasting road hazard alerts across the FM frequency spectrum remains deficient in several aspects. For example, it can be difficult to deploy analog based systems in the harsh environment of emergency vehicles. Second, the strict requirements of the FCC mandate particular broadcasting techniques not presently satisfied by existing systems. Third, conventional emergency broadcasting systems fail to provide flexibility in the type and content of alert messages provided to nearby motorists. Finally, conventional emergency broadcasting systems cannot be adapted to provide alerts based on events other than approaching road hazards, such as so-called "Amber Alerts", terrorist warnings, and general information dissemination practices.

SUMMARY OF THE INVENTION

The present invention is a selective message broadcasting system which overcomes the deficiencies of the referenced art. In particular, unlike convention emergency vehicle alert broadcasting systems, in the message broadcasting system of the present invention, a multiplicity of messages can be pre-recorded and digitally retrieved on command as the occasion arises. Furthermore, messages can be recorded on an ad-hoc basis. Significantly, a selected message can be broadcast to a set of transmission channels in a particular broadcast spectrum while maintaining the required silence intervals between each transmission channel. Thus, unlike conventional attempts to provide a comprehensive alert messaging system, the present invention can satisfy the requirements of the United States FCC.

A selective message broadcasting system which has been configured in accordance with the present invention can include fixed storage configured to store a plurality of pre-recorded audio messages. A digital audio system can be coupled to the fixed storage, the digital audio system including playback logic for playing back selected ones of the pre-recorded audio messages stored in the fixed storage. A center frequency modulator can be coupled to the digital audio system and the modulator can be configured to modulate the selected ones of the pre-recorded audio messages about a center frequency in a particular broadcast spectrum. Finally, a frequency band comb distributor can be coupled to the center frequency modulator and configured to replicate the modulated selected ones of the pre-recorded audio messages across a set of frequency transmission channels in the particular broadcast spectrum while maintaining a silence interval between each of the frequency transmission channels in the particular broadcast spectrum. Notably, the broadcast spectrum can include the FM spectrum and the AM spectrum.

A method of selectively broadcasting messages from a broadcast transmitter across a multiplicity of frequency transmission channels to receivers in short range of the transmitter can include several steps. First, one of a set of pre-recorded messages stored in fixed storage can be selected in the transmitter. The selected one of the set of pre-recorded messages can be played back. Subsequently, the digitally played back message can be modulated about a center frequency in a particular broadcast spectrum. Importantly, the modulated message can be replicated across a selection of broadcast transmission channels in the particular broadcast spectrum while maintaining silence intervals in between each one of the broadcast transmission channels. Finally, the replications can be amplified and the amplication can be transmitted to the receivers in short range of the transmitter.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a selective message broadcasting system. In accordance with the inventive arrangements, a selective message broadcasting system can broadcast selected ones of pre-recorded messages and newly recorded messages to closely proximate radio receivers such as those radios typically disposed in commercial and passenger vehicles. The pre-recorded messages can be stored in fixed storage such as solid state memory or disk medium and can be quickly accessed through a computer-human interface. Once selected, the pre-recorded message can be modulated for transmission at a center frequency and broadcast at short range across a wide selection of FM channels while preserving the silence intervals mandated by the United States FCC.

In this way, proximately positioned radio receivers can receive the broadcast message. In consequence, passing motorists can receive not just an audible generic alert, but pertinent, information such as that type of information associated with road hazards, safety information and public welfare information. The invention can provide particular utility when incorporated into emergency vehicles such as police cruisers, ambulances and fire engines. When incorporated in such emergency vehicles, the operator of the emergency vehicle not only can choose to broadcast an emergency message to those vehicles in close proximity to the emergency vehicle, but also the operator can select a particular message which might be deemed helpful when received by nearby motorists. Similarly, the invention can be included in public transportation vehicles such as buses and trains, as well as taxi cabs. Moreover, when positioned in proximity to a construction site, the invention can provide clear warning to passing motorists of dangerous driving conditions.

Figure 1:
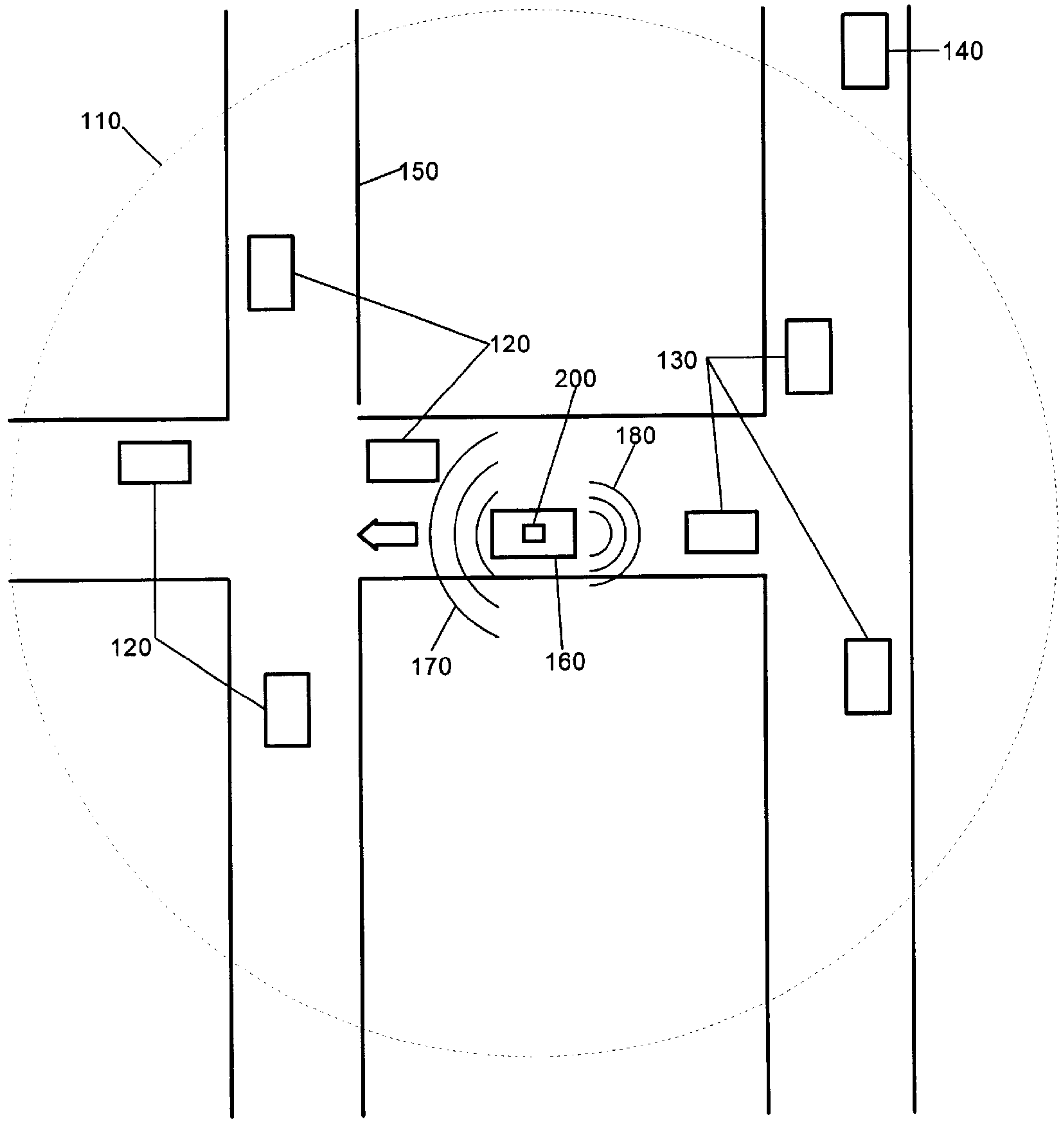
FIG. 1 is a pictorial illustration of a selective message broadcasting system operating from a moving vehicle in accordance with the inventive arrangements.

FIG. 1 is a pictorial illustration of a selective message broadcasting system operating in accordance with the inventive arrangements. Referring now to FIG. 1, a subject vehicle 160 can be coupled to the selective message broadcasting system 200 of the present invention. As the subject vehicle 160 travels about the roadway 150, other vehicles 120, 130 which fall within the short-range broadcasting zone 110 can detect the presence of the vehicle through the broadcast transmissions 170, 180 of the subject vehicle 160. Vehicles 140 which fall outside of the short-range broadcasting zone 110, however, cannot detect the presence of the vehicle through the broadcast transmissions 170, 180.

The selective message broadcasting system 200 can provide a set of pre-recorded messages from which the operator of the subject vehicle 160 can select an activated message. Once selected, the activated message, when triggered, can be broadcast across a selection of radio channels such as those enumerated channels in the FM or AM spectrum. Notably, unlike previous emergency vehicle alert systems, however, the activated message can be broadcast across the frequency spectrum in accordance with the mandated broadcast requirements of the FCC. Namely, the selective message broadcasting system 200, through the use of non-inductive, digital signal processing, can ensure that the required silence intervals in between FM channels are maintained in the course of broadcasting the activated message.

Vehicles 120, 130 which fall within the short-range broadcasting zone 110 can receive the broadcast transmissions 170, 180 at the radio channel to which the radio receiver of the respective vehicles 120, 130 have been tuned. Vehicles 140 which fall outside of the short-range broadcasting zone 110, however, will be unable to receive the broadcast transmissions 170, 180, and will receive instead at the designated frequency channel those far-range transmissions provided by ordinary radio broadcasting stations. In this way, the activated message can be targeted to a select audience of localized receivers for which the activated message can have particular pertinence.

Importantly, individual ones of the messages stored in the selective message broadcasting system 200 can be selected by the operator of the subject vehicle 160 "on the fly" as the situation calls for different messages. For instance, where the subject vehicle 160 is a police cruiser engaged in "hot pursuit", a message can be selected during the pursuit to indicate to the vehicles 120, 130 within the short-range broadcasting zone 110 that a pursuit is in progress and, for safety's sake, the vehicles 120, 130 should pull to the side of the roadway 150. By comparison, in the same subject vehicle 160, when the police cruiser has undertaken a traffic stop at the side of the roadway 150, a message can be selected instantly at that time to caution nearby vehicles 120, 130 to proceed with caution as a police cruiser has pulled to the side of the roadway 150.

Significantly, unlike those emergency vehicle broadcasting systems which depend upon analog tape technology to store emergency messages, in the present invention, messages can be recalled quickly with ease due to the use of a solid state audio system in the selective message broadcasting system 200 of the present invention. As messages can be stored in fixed storage, such as disk or solid state memory, messages can be retrieved instantaneously without requiring the time-consuming guess work of rewind and fast-forward operations ordinarily associated with an analog tape playback device. Additionally, where no one message can suffice for the circumstances at hand, messages can be easily recorded to memory whereas the use of an analog tape recorder would require yet further use of rewind and fast-forward operations which are not compatible with the operation of an emergency vehicle in time of crisis.

It will be apparent to one skilled in the art that the application of the selective message broadcasting system 200 illustrated in FIG. 1 is not limited merely to emergency vehicles. Rather, as the selective messages can pertain to countless circumstances with particularity (unlike the generic nature of prior art emergency vehicle broadcasting systems), the selective message broadcasting system 200 can apply equally as well in non-emergency vehicle scenarios. Examples include public transportation, public welfare information dissemination, security alerts, and the like.

For example, in the public transportation scenario, a bus can pull to the side in traffic to take on and let off passengers. In that case, the broadcast message produced and transmitted by the selective message broadcasting system 200 can indicate to nearby motorists to maintain a heightened awareness of a slowing bus pulling to the side of the road. As the bus begins to pull back into the roadway, a second message can be quickly selected to indicate that nearby motorists should yield to the bus as the bus re-enters the roadway. In this way nearby motorists can take evasive action without overreacting as would be the case were the alert to comprise merely a siren or other generic audible indication.

Returning now to FIG. 1, in accordance with a preferred aspect of the present invention, the selective message broadcasting system 200 can transmit the activated message not only omni-directionally, but also in a directional manner. Specifically, where it is preferred that only those receivers within range of the selective message broadcasting system 200 in a particular direction receive the activated message a stronger transmission broadcast 170 can be provided by way of a directional antenna. In contrast, though the activated message can be transmitted in other directions, the transmission broadcast 180 can be less strong so as to provide a reduced range on those directions not addressed by the directional antenna. In the case of an emergency vehicle, the use of a directional signal can be helpful inasmuch as nearby motorists who are not within the travel path of the emergency need not take evasive action upon receiving an alert.

Figure 2:
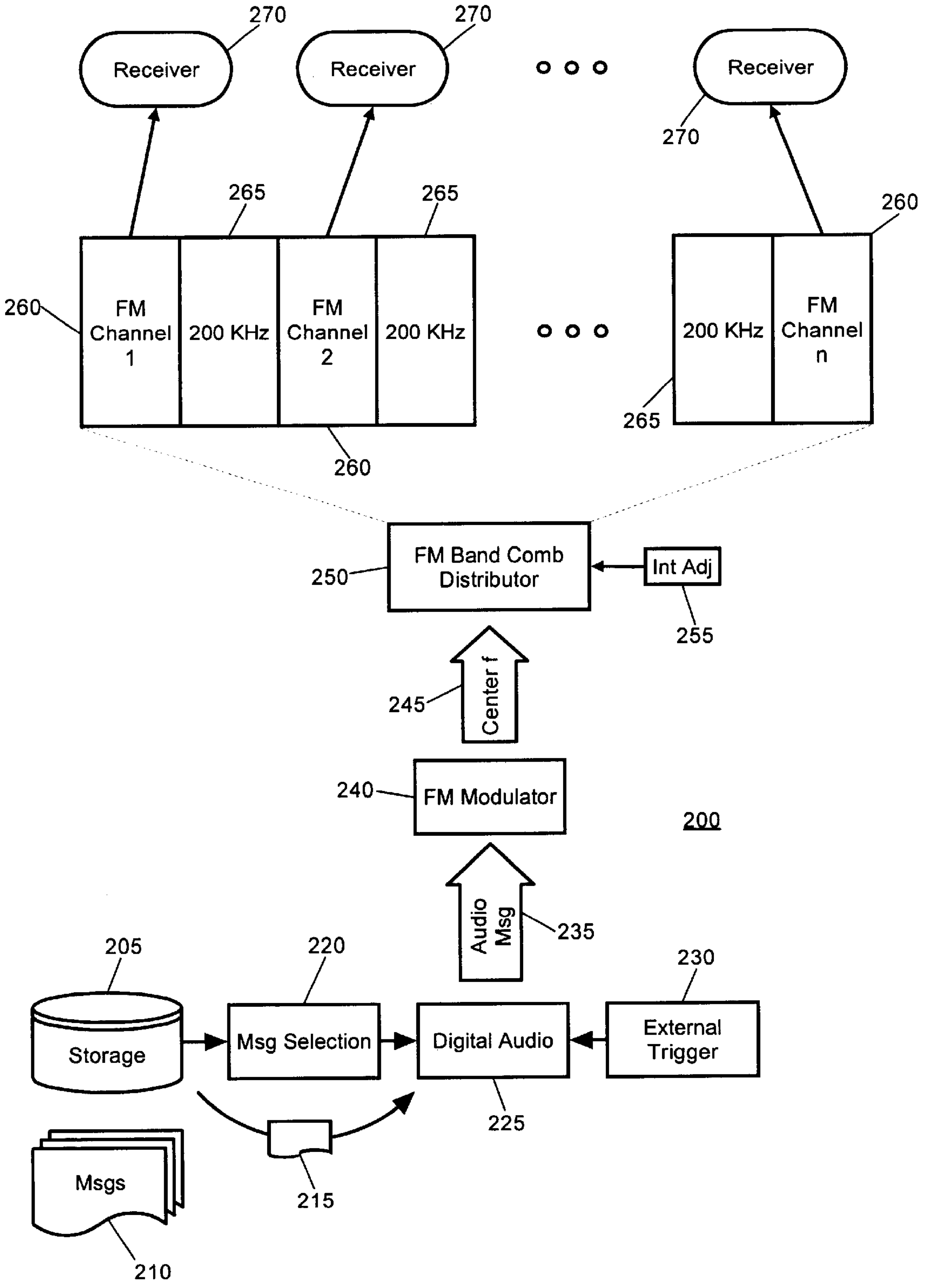
FIG. 2 is a block diagram illustrating the operation of the selective message broadcasting system of FIG. 1; and, FIG. 3 is a schematic illustration of a selective message broadcasting system of FIG. 1.

Referring now to FIG. 2, a block diagram has been provided in which the operation of the selective message broadcasting system 200 of FIG. 1 has been illustrated. In the selective message broadcasting system 200, pre-recorded messages 210 can be stored in fixed storage 205. Fixed storage 205 can include solid state memory, though the invention is not so limited simply to solid state memory and other fixed storage devices can suffice such as hard disk media. Individual ones of the pre-recorded messages can be selected and, in particular, at least one activated message 215 can be specified by message selection logic 220 for broadcast by the selective message broadcast system 200.

A digital audio system 225 can receive the activated message 215 and provide audio playback in the form of an audio message 235. Still, the digital audio system 225 is not limited strictly to digital audio playback and other functions can be included therewith. For instance, new messages can be recorded using the digital audio system and the newly recorded messages can be stored in fixed storage 205 along with the pre-recorded messages 210. Additionally, the storage and organization of the various pre-recorded messages 210 can be managed from within the digital audio system 225. Finally, any one pre-recorded message 210 stored in fixed storage 205 can be previewed in the digital audio system 225 on command.

In any case, an external trigger 230 can cause the digital audio system 225 to produce the audio message 235 and to provide the produced audio message 235 to an FM modulator. Specifically, the external trigger 230 can be linked to any triggering device, ranging from a push button to a remotely positioned sensor. For instance, the external trigger 230 can be linked to the closing or opening of a vehicle door, the activation of a siren, the flashing relays of a brake light system in a bus, low-speed detectors on trains, emergency radios and beacon transmitters on boats, and the like. In essence, the occurrence of an external event, when transduced to an electrical signal can cause the production of the audio message 235 and the providing of the audio message 235 to the FM modulator 240.

The FM modulator 240 can frequency modulate the audio message 235 about a central frequency, for instance 98 MHz or 98.1 MHz, thereby producing an FM modulated input signal 245. The FM modulated input signal 245 can be provided to an FM band comb distributor 250. The FM band comb distributor 250 can produce sufficient reproductions of the FM modulated input signal 245 onto a selection or all of the available FM band transmission channels 260, ranging, for example, from 88.1 MHz to 107.9 MHz with separations 265 of 200 KHz per channel. Notably, an international frequency adjustment mechanism 255 can be coupled to the FM band comb distributor so as to re-distribute the output frequency spectrum to comport with the international FM frequency spectrum specification whose FM channels fall on even numbered frequencies rather than odd numbered frequencies.

In any event, once the broadcast transmission has been provided across the selection of FM channels 260, individual receivers can receive the broadcast transmission of the audio message 235, regardless of which channel to which the individual receivers are tuned. In this way, as the selective message broadcasting system 200 provides relevant information in the form of a broadcast transmission to nearby receivers, it can be presumed that all receivers which had been tuned to one of the selected FM channels will receive the broadcast transmission over the broadcast content provided by a broadcast station ordinarily charged with broadcasting at that frequency.

Figure 3:
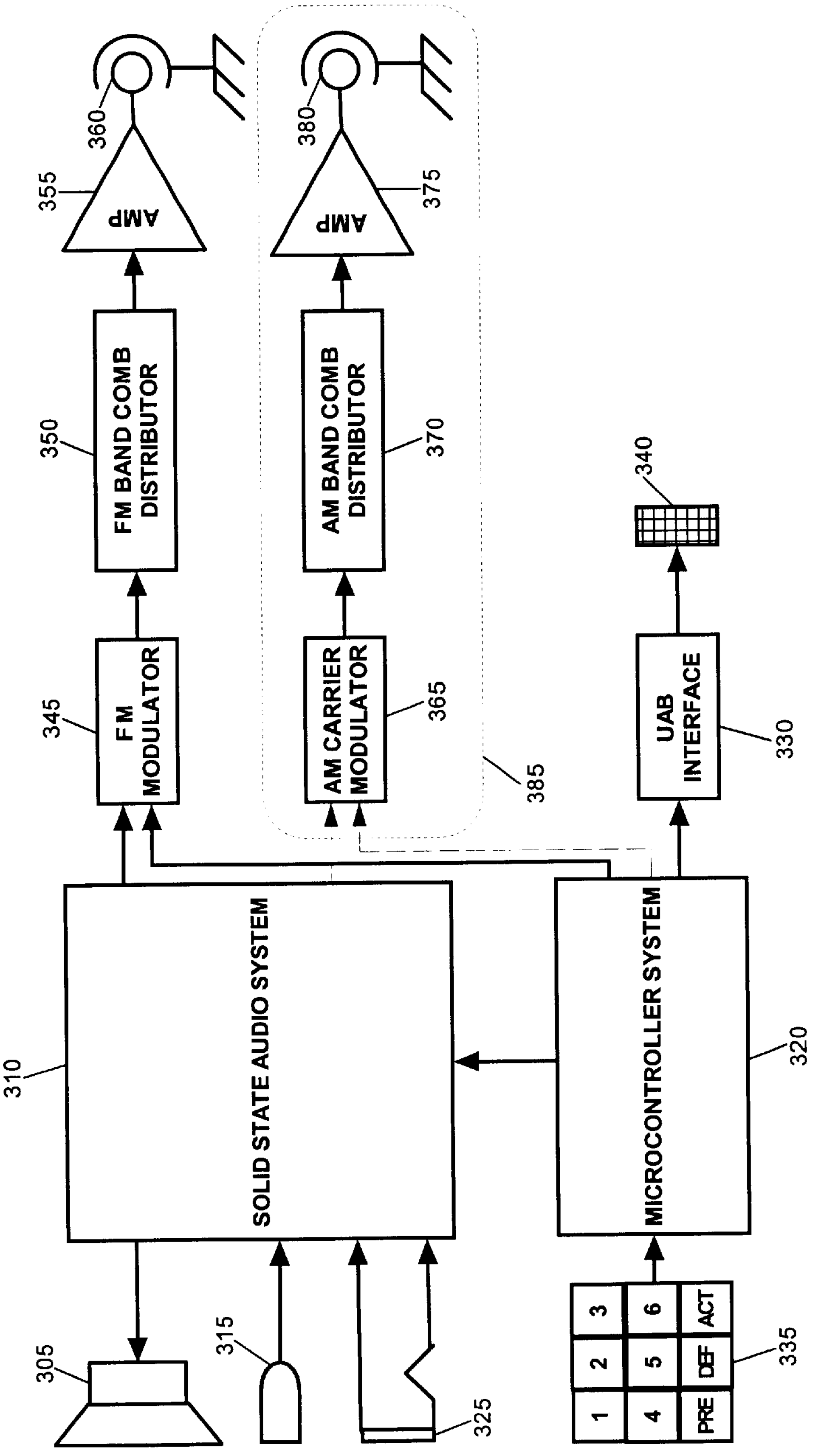

FIG. 3 is a schematic illustration of the selective message broadcasting system of FIG. 1. In accordance with a preferred albeit not exclusive aspect of the inventive arrangements, the selective message broadcasting system can include a solid state audio system 310 coupled to each of an audio output device 305, an audio input device 315, and an external microphone connector 325 having a push button interface. A microcontroller 320 can be communicatively linked to the solid state audio system 310 and a keypad 335 can be coupled to the microcontroller system 320. The microcontroller system 320 both can be programmed and controlled by an operator using the keypad 335.

Both the solid state audio system 310 and the microcontroller system 320 can be coupled to an FM modulator 345. The FM modulator 345 can modulate audio output produced by the solid state audio system 310 about a center frequency. The modulated signal can further be provided to an FM band comb distributor 350 which can replicate the signal across a selected group of frequencies in the FM frequency spectrum. Notably, in a preferred aspect of the present invention, the FM band comb distributor 350, through inductionless digital signal processing, can replicate the signal across all defined frequency channels of the FM frequency spectrum, without bleeding signal into the mandated silence intervals between each frequency channel.

Once the FM band comb distributor 350 has produced the signal across the selected set of frequency channels, the broadcast signal can be provided to an amplifier 355 which can amplify the signal before forwarding the amplified signal to an antenna 360 for transmission to nearby receivers. Preferably, the amplifier can amplify the signal enough to provide the short range of 1,000 feet, though the invention is not strictly limited to the extent of the short-range of the broadcast. Additionally, depending upon the particular application, it may be preferable to substitute a directional antenna for an omni-directional antenna.

Though the foregoing invention has been disclosed mostly in reference to the FM frequency spectrum, one skilled in the art will recognize that the invention is not so limited. Rather, it will be apparent to the skilled artisan that a similar configuration can be provided to accommodate the broadcasting of the audio messages across a selection of AM transmission channels, ranging for example from 535 KHz to 1605 KHz, with 10 KHz separations between each channel. As an example, FIG. 3 yet further illustrates an optional AM broadcast transmission module 385. The AM broadcast transmission module in particular can include an AM carrier modulator in which the audio message can be modulated about a central frequency before the input signal can be provided to an AM band comb distributor 370. The AM band comb distributor, like the FM band comb distributor 350, can replicate the input signal about a selection of AM band transmission channels, before providing the replicated signals to an amplifier 375 and ultimately to an antenna 380.

In either case, a universal annunciator bus (UAB) connector 330 can be provided to permit the further coupling of the selective message broadcasting system to external components, such as sensors, switches, signals, and other environment condition detecting structure. Through the UAB connector 330, the activation or deactivation of any one of the coupled external components can trigger the broadcast transmission of a selected message. To that end, a UAB interface 340 further can be provided to facilitate the coupling of the external components to the selective message broadcasting system. Namely, the signal levels of the external components can be converted for compatibility with the electronics of the microcontroller system 320.

Based upon the foregoing, it will be recognized by one skilled in the art that the use of the selected message broadcasting system can both save lives and prevent unnecessary bodily harm as recipients of the selected messages will know not only that a hazard may exist in close proximity to the recipients, but also the recipients will hear more specifically related information rather than a generic alert. Consequently, reduced overreaction to generic alerts can be expected. In any event, this invention can be embodied in other specific forms without departing from the spirit or essential attributes thereof, and accordingly, reference should be had to the following claims, rather than to the foregoing specification, as indicating the scope of the invention.

We claim:

1. A selective message broadcasting system comprising:

fixed storage configured to store a plurality of pre-recorded audio messages, a digital audio system coupled to said fixed storage, said digital audio system comprising playback logic for playing back selected ones of said pre-recorded audio messages stored in said fixed storage;

a center frequency modulator coupled to said digital audio system and configured to modulate said selected ones of said pre-recorded audio messages about a center frequency in a particular broadcast spectrum; and, a frequency band comb distributor coupled to said center frequency modulator and configured to replicate said modulated selected ones of said pre-recorded audio messages across a set of frequency transmission channels in said particular broadcast spectrum while maintaining a silence interval between each of said frequency transmission channels in said particular broadcast spectrum.

2. The system of claim 1, wherein said broadcast spectrum is selected from the group consisting of the FM spectrum and the AM spectrum.

3. The system of claim 1, further comprising:

a microcontroller system coupled to said frequency modulator and said digital audio system; and, a keypad interface coupled to said microcontroller system.

4. A selective message broadcasting system comprising:

fixed storage configured to store a plurality of pre-recorded audio messages;

a digital audio system coupled to said fixed storage, said digital audio system comprising playback logic for playing back selected ones of said pre-recorded audio messages stored in said fixed storage;

a center frequency modulator coupled to said digital audio system and configured to modulate said selected ones of said pre-recorded audio messages about a center frequency in a particular broadcast spectrum;

a frequency band comb distribution coupled to said center frequency modulator and configured to replicate said modulated selected ones of said pre-recorded audio messages across a set of frequency transmission channels in said particular broadcast spectrum while maintaining a silence interval between each of said frequency transmission channels in said particular broadcast spectrum;

a microcontroller system coupled to said frequency modulator and said digital audio system;

a keypad interface coupled to said microcontroller system; and an external component interface coupled to said microcontroller system, said external component interface providing trigger logic to said microcontroller system based upon externally transduced events.

5. The system of claim 1, further comprising message selection logic through which individual ones of said pie-recorded messages can be selected for playback in said digital audio system.

6. The system of claim 1, wherein said digital audio system further comprises a digital audio recorder for recording individual ones of said pre-recorded messages.

7. A selective message broadcasting system comprising:

fixed storage configured to store a plurality of pre-recorded audio messages;

a digital audio system coupled to said fixed storage, said digital audio system comprising playback logic for playing back selected ones of said pre-recorded audio messages stored in said fixed storage;

a center frequency modulator coupled to said digital audio system and configured to modulate said selected ones of said pre-recorded audio messages about a center frequency in a particular broadcast spectrum;

a frequency band comb distributor coupled to said center frequency modulator and configured to replicate said modulated selected ones of said pre-recorded audio messages across a set of frequency transmission channels in said particular broadcast spectrum while maintaining a silence interval between each of said frequency transmission channels in said particular broadcast spectrum; and an international adjustment switch coupled to said frequency band comb distributor, said switch when activated re-distributing said replicated pre-recorded audio messages in said set of frequency transmission channels to align said frequency transmission channels with an international implementation of said particular broadcast spectrum.

8. The system of claim 1, further comprising:

an amplifier coupled to said frequency mind comb distributor, and, an antenna coupled to said amplifier.

9. The system of claim 8, wherein said antenna is a directional antenna.

10. A method of selectively broadcasting messages from a broadcast transmitter across a multiplicity of frequency transmission channels to receivers in short range of said transmitter, said method comprising the steps of:

selecting one of a set of pre-recorded messages stored in fixed storage in the transmitter digitally playing back said selected one of said set of pre-recorded messages;

modulating said digitally played back message about a center frequency in a particular broadcast spectrum;

replicating said modulated message across a selection of broadcast transmission channels in said particular broadcast spectrum while maintaining silence intervals in between each one of said broadcast transmission channels; and, amplifying said replications and transmitting said amplification to the receivers in short range of the transmitter.

11. The method of claim 10, further comprising the step of:

repeating said playing back, modulating, replicating, amplifying and transmitting periodically in a loop.

12. The method of claim 10, further comprising the steps of:

recording at least one of said pre-recorded messages; and, storing said at least one recorded message in said fixed storage.

13. The method of claim 10, wherein each of said modulating and replicating steps are performed in a digital signal processor.

14. A method of selectively broadcasting messages from a broadcast transmitter across a multiplicity of frequency transmission channels to receivers in short range of said transmitter, said method comprising the steps of:

selecting one of a set of pre-recorded messages stored in fixed storage in the transmitter, digitally playing back said selected one of said set of pre-recorded messages, modulating said digitally played back message about a center frequency in a particular broadcast spectrum;

replicating said modulated message across a selection of broadcast transmission channels in said particular broadcast spectrum while maintaining silence intervals in between each one of said broadcast transmission channels;

amplifying said replications and transmitting said amplification to the receivers in short range of the transmitter; and previewing said selected one of said pre-recorded messages before selecting said selected one of said pre-recorded messages.

15. A machine readable storage having stored thereon a computer program for selectively broadcasting messages from a broadcast transmitter across a multiplicity of frequency transmission channels to receivers in short range of said transmitter, said computer program comprising a routine set of instructions which when executed cause the machine to perform the steps of;

selecting one of a set of pre-recorded messages stored in fixed storage in the transmitter;

digitally playing hack said selected one of said set of pre-recorded messages;

modulating said digitally played back message about a center frequency in a particular broadcast spectrum;

replicating said modulated message across a selection of broadcast transmission channels in said particular broadcast spectrum while maintaining silence intervals in between each one of said broadcast transmission channels; and, amplifying said replications and transmitting said amplification to the receivers in short range of the transmitter.

16. The machine readable storage of claim 15, further comprising the step of repeating said playing back, modulating, replicating, amplifying and transmitting periodically in a loop.

17. The machine readable storage of claim 15, further comprising the steps of:

recording at teas; one of said pre-recorded messages; and, storing said at least one recorded message in said fixed storage.

18. A machine readable storage having stored thereon a computer program for selectively broadcasting messages from a broadcast transmitter across a multiplicity of frequency transmission channels to receivers in short range of said transmitter, said computer program comprising a routine set of instructions which when executed cause the machine to perform the steps of:

selecting one of a set of pre-recorded messages stored in fixed storage in the transmitter;

digitally playing back said selected one of said set of pre-recorded messages;

modulating said digitally played back message about a center frequency in a particular broadcast spectrum;

replicating said modulated message across a selection of broadcast transmission channels in said particular broadcast spectrum while maintaining silence intervals in between each one of said broadcast transmission channels, amplifying said replications and transmitting said amplification to the receivers in short range of the transmitter; and previewing said selected one of said pre-recorded messages before selecting said selected one of said pre-recorded messages.

* * * * *